US006920149B2

(12) United States Patent
Robledo et al.

(10) Patent No.: US 6,920,149 B2
(45) Date of Patent: Jul. 19, 2005

(54) DIGITAL DATA TRANSMISSION SYSTEM

(75) Inventors: Miguel Robledo, Nuernberg (DE); Bernd Markus K. Bleisteiner, Fuerth (DE); Martin Saeger, Nuernberg (DE); Dirk Schmidt, Bavaria (DE)

(73) Assignee: Lucent Technologies Inc., Murray Hill, NJ (US)

( * ) Notice: Subject to any disclaimer, the term of this patent is extended or adjusted under 35 U.S.C. 154(b) by 827 days.

(21) Appl. No.: 09/865,065

(22) Filed: May 24, 2001

(65) Prior Publication Data

US 2002/0018493 A1 Feb. 14, 2002

(30) Foreign Application Priority Data

May 30, 2000 (EP) ........................................... 00111539

(51) Int. Cl.[7] ............................................... H04L 12/43
(52) U.S. Cl. ....................................... 370/458; 370/474
(58) Field of Search ............................ 370/351–3, 389, 370/391, 392, 431, 442, 458, 464–9, 474, 476

(56) References Cited

U.S. PATENT DOCUMENTS

| | | | | |
|---|---|---|---|---|
| 4,667,324 A | | 5/1987 | Graves | 370/102 |
| 5,793,760 A | * | 8/1998 | Chopping | 370/355 |
| 6,188,667 B1 | * | 2/2001 | Roberts et al. | 370/219 |
| 6,285,673 B1 | * | 9/2001 | Blackburn et al. | 370/360 |
| 6,608,844 B1 | * | 8/2003 | Teodorescu et al. | 370/512 |
| 6,717,958 B1 | * | 4/2004 | Kim | 370/506 |
| 6,731,656 B1 | * | 5/2004 | Slater et al. | 370/536 |
| 2001/0053146 A1 | * | 12/2001 | Lyon et al. | 370/359 |

FOREIGN PATENT DOCUMENTS

EP 1 043 856 A2 11/2000 ............. H04J/3/16

OTHER PUBLICATIONS

Proposed OCh–OH Assignments for the OCh Frame, J. Ballintine, XP–002150708, T1X1.5/99–146, 1–7.

A Proposal For A Rate–Preserving OCh Overhead Approach, M. Wright, XP–002150709, T1X1.5/99–103, 1–7.

European Search Report (Mitteilung) dated Mar. 11, 2000.

* cited by examiner

*Primary Examiner*—David Vincent

(57) ABSTRACT

The invention relates to a data transmission system for the frame-oriented digital data transmission of a plurality of useful signals embedded in a carrier signal, using time-division multiplex operation, rate matching being undertaken between the useful signals and the carrier signal by means of stuff locations. The data to be stuffed, and the management information for the reassignment are embedded in previously unused 8 bytes in the path layer overhead of the carrier signal superframe, and protected by an HC(6, 3,3) code. Clear channel signals can advantageously be transmitted using the system, and the transmission is time-transparent and data-transparent.

17 Claims, 7 Drawing Sheets

FIG. 2

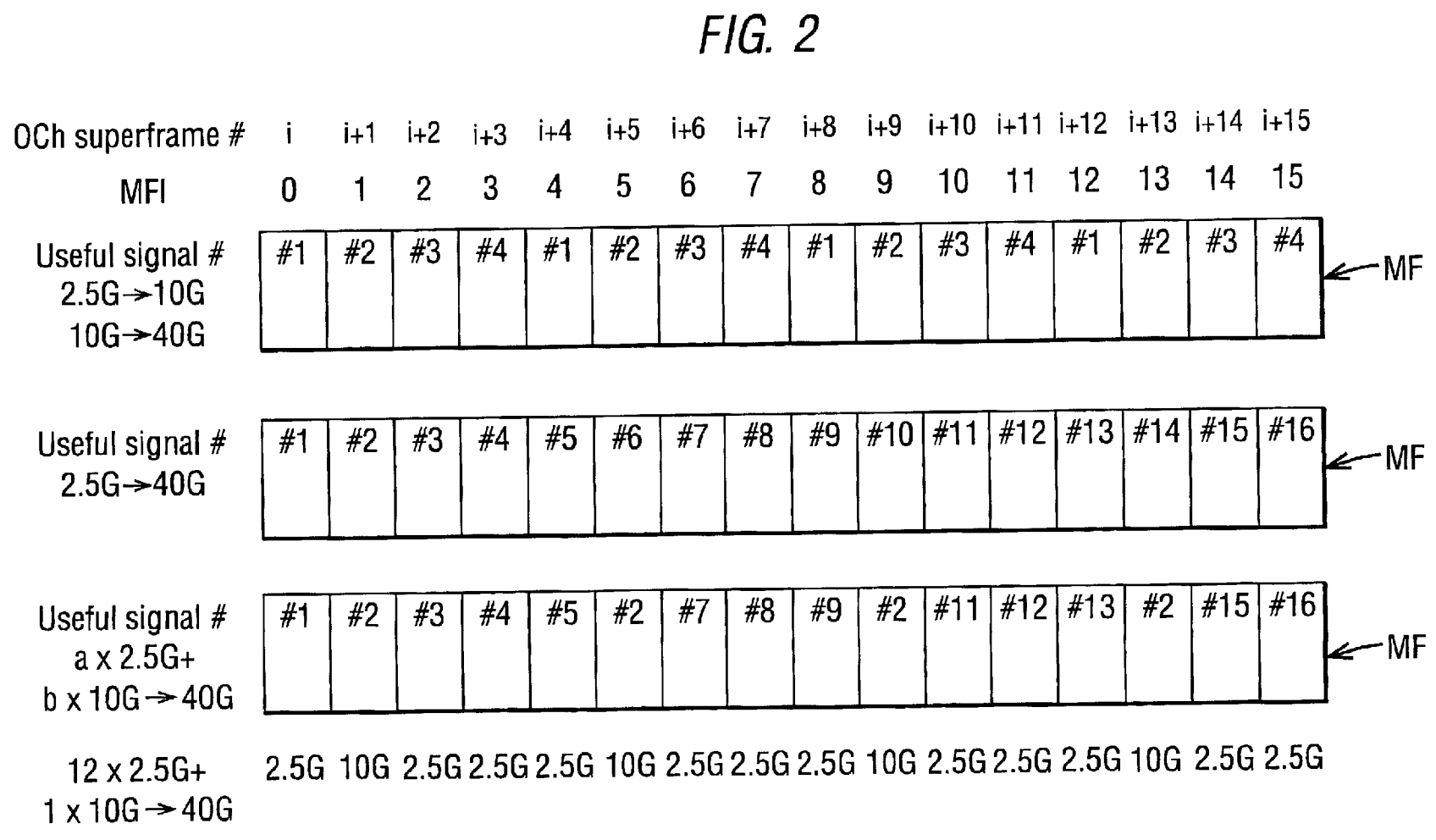

Figure 1:
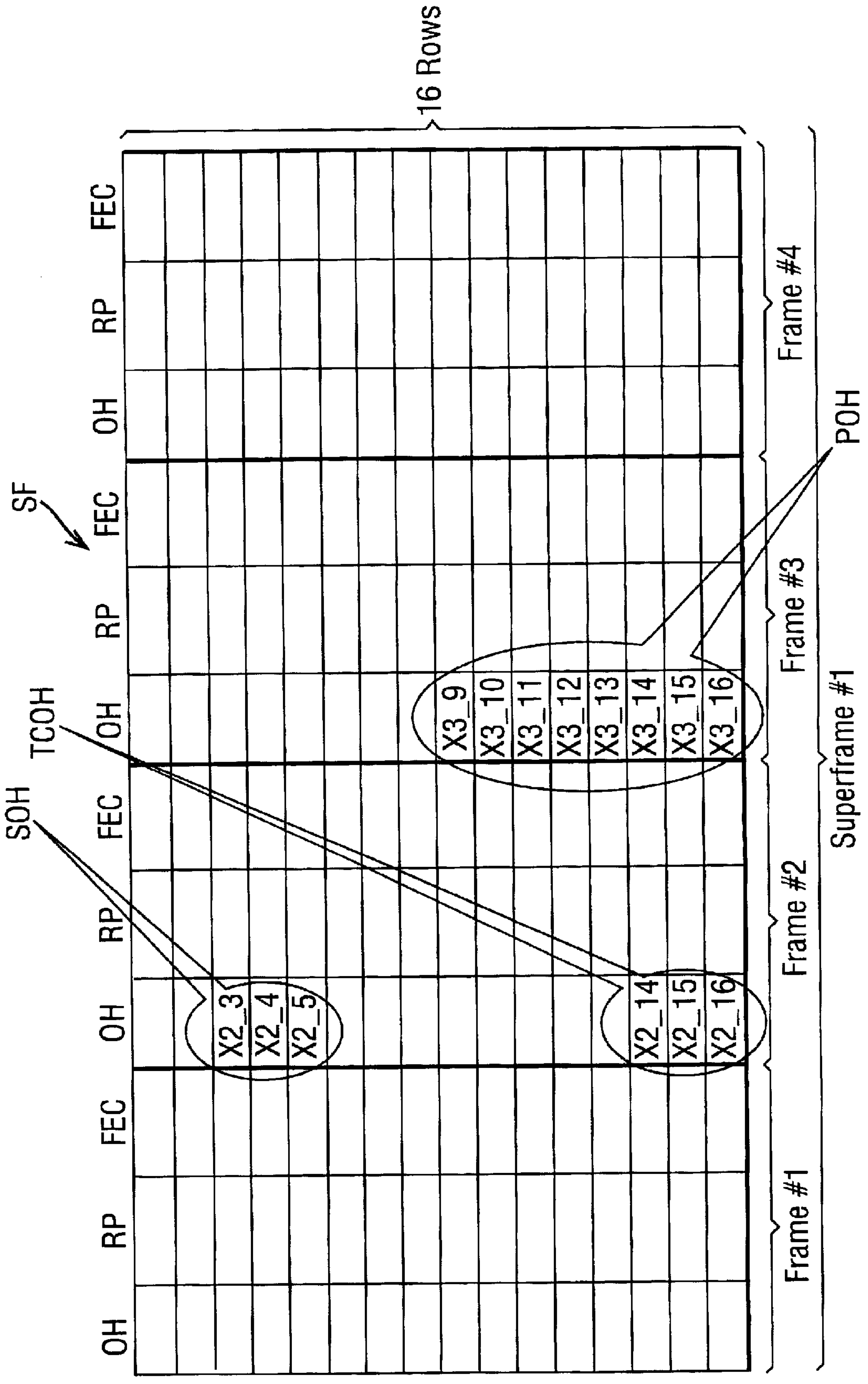

| OCh superframe # | i | i+1 | i+2 | i+3 | i+4 | i+5 | i+6 | i+7 | i+8 | i+9 | i+10 | i+11 | i+12 | i+13 | i+14 | i+15 |
|---|---|---|---|---|---|---|---|---|---|---|---|---|---|---|---|---|
| MFI | 0 | 1 | 2 | 3 | 4 | 5 | 6 | 7 | 8 | 9 | 10 | 11 | 12 | 13 | 14 | 15 |
| Useful signal # 2.5G→10G 10G→40G | #1 | #2 | #3 | #4 | #1 | #2 | #3 | #4 | #1 | #2 | #3 | #4 | #1 | #2 | #3 | #4 |
| Useful signal # 2.5G→40G | #1 | #2 | #3 | #4 | #5 | #6 | #7 | #8 | #9 | #10 | #11 | #12 | #13 | #14 | #15 | #16 |
| Useful signal # a x 2.5G+ b x 10G→40G | #1 | #2 | #3 | #4 | #5 | #2 | #7 | #8 | #9 | #2 | #11 | #12 | #13 | #2 | #15 | #16 |
| 12 x 2.5G+ 1 x 10G→40G | 2.5G | 10G | 2.5G | 2.5G | 2.5G | 10G | 2.5G | 2.5G | 2.5G | 10G | 2.5G | 2.5G | 2.5G | 10G | 2.5G | 2.5G |

MF

FIG. 3

| OCh column/row | | OH: 1 | SPE: 2 | 3 | 4 | 5 | 6 | Useful signal # |
|---|---|---|---|---|---|---|---|---|
| 1 | X3_1 | OCh-POH bytes with regular meaning | (+)RP | RP | RP | RP | RP | Useful signal #1 |
| 2 | X3_2 | | (+)RP | RP | RP | RP | RP | Useful signal #2 |
| 3 | X3_3 | | (+)RP | RP | RP | RP | RP | Useful signal #3 |
| 4 | X3_4 | | (+)RP | RP | RP | RP | RP | Useful signal #4 |
| 5 | X3_5 | | (+)RP | RP | RP | RP | RP | Useful signal #1 |
| 6 | X3_6 | | (+)RP | RP | RP | RP | RP | Useful signal #2 |
| 7 | X3_7 | | (+)RP | RP | RP | RP | RP | Useful signal #3 |
| 8 | X3_8 | | (+)RP | RP | RP | RP | RP | Useful signal #4 |
| 9 | X3_9 | Stuff control management information Useful signal #i (i ∈ [1,...,4]) as a function of the MFI 104 | (+)RP | RP | RP | RP | RP | Useful signal #1 |
| 10 | X3_10 | | (+)RP | RP | RP | RP | RP | Useful signal #2 |
| 11 | X3_11 | | (+)RP | RP | RP | RP | RP | Useful signal #3 |
| 12 | X3_12 | | (+)RP | RP | RP | RP | RP | Useful signal #4 |
| 13 | X3_13 | Negative stuff locations (-) (4 bytes) Useful signal #i 105 (i ∈ [1,...,4]) as a function of the MFI | (+)RP | RP | RP | RP | RP | Useful signal #1 |
| 14 | X3_14 | | (+)RP | RP | RP | RP | RP | Useful signal #2 |
| 15 | X3_15 | | (+)RP | RP | RP | RP | RP | Useful signal #3 |
| 16 | X3_16 | | (+)RP | RP | RP | RP | RP | Useful signal #4 |

16 parallel rows

FIG. 4

| OCh column/row | | OH 1 | SPE 2 | SPE 3 | SPE 4 | SPE 5 | SPE 6 | Useful signal # |
|---|---|---|---|---|---|---|---|---|
| 1 | X3_1 | OCh-POH bytes with regular meaning | (+)RP | (+)RP | (+)RP | (+)RP | RP | Useful signal #1 |
| 2 | X3_2 | | (+)RP | (+)RP | (+)RP | (+)RP | RP | Useful signal #2 |
| 3 | X3_3 | | (+)RP | (+)RP | (+)RP | (+)RP | RP | Useful signal #3 |
| 4 | X3_4 | | (+)RP | (+)RP | (+)RP | (+)RP | RP | Useful signal #4 |
| 5 | X3_5 | | (+)RP | (+)RP | (+)RP | (+)RP | RP | Useful signal #5 |
| 6 | X3_6 | | (+)RP | (+)RP | (+)RP | (+)RP | RP | Useful signal #6 |
| 7 | X3_7 | | (+)RP | (+)RP | (+)RP | (+)RP | RP | Useful signal #7 |
| 8 | X3_8 | | (+)RP | (+)RP | (+)RP | (+)RP | RP | Useful signal #8 |
| 9 | X3_9 | Stuff control management information Useful signal #i (i ∈ [1,...,16]) as a function of the MFI 104 | (+)RP | (+)RP | (+)RP | (+)RP | RP | Useful signal #9 |
| 10 | X3_10 | | (+)RP | (+)RP | (+)RP | (+)RP | RP | Useful signal #10 |
| 11 | X3_11 | | (+)RP | (+)RP | (+)RP | (+)RP | RP | Useful signal #11 |
| 12 | X3_12 | | (+)RP | (+)RP | (+)RP | (+)RP | RP | Useful signal #12 |
| 13 | X3_13 | Negative stuff locations (-) (4 bytes) Useful signal #i (i ∈ [1,...,16]) as a function of the MFI 105 | (+)RP | (+)RP | (+)RP | (+)RP | RP | Useful signal #13 |
| 14 | X3_14 | | (+)RP | (+)RP | (+)RP | (+)RP | RP | Useful signal #14 |
| 15 | X3_15 | | (+)RP | (+)RP | (+)RP | (+)RP | RP | Useful signal #15 |
| 16 | X3_16 | | (+)RP | (+)RP | (+)RP | (+)RP | RP | Useful signal #16 |

16 parallel rows

FIG. 5

| OCh column/row | | OH 1 | SPE 2 | SPE 3 | SPE 4 | SPE 5 | SPE 6 | Useful signal # |
|---|---|---|---|---|---|---|---|---|
| 1 | X3_1 | OCh-POH bytes with regular meaning | (+)RP | (+)RP | (+)RP | (+)RP | RP | Useful signal #1 |
| 2 | X3_2 | | (+)RP | RP | RP | RP | RP | Useful signal #2 |
| 3 | X3_3 | | (+)RP | (+)RP | (+)RP | (+)RP | RP | Useful signal #3 |
| 4 | X3_4 | | (+)RP | (+)RP | (+)RP | (+)RP | RP | Useful signal #4 |
| 5 | X3_5 | | (+)RP | (+)RP | (+)RP | (+)RP | RP | Useful signal #5 |
| 6 | X3_6 | | (+)RP | RP | RP | RP | RP | Useful signal #6 |
| 7 | X3_7 | | (+)RP | (+)RP | (+)RP | (+)RP | RP | Useful signal #7 |
| 8 | X3_8 | | (+)RP | (+)RP | (+)RP | (+)RP | RP | Useful signal #8 |
| 9 | X3_9 | Stuff control management information Useful signal #i (i ∈ [1,...,16]) as a function of the MFI 104 | (+)RP | (+)RP | (+)RP | (+)RP | RP | Useful signal #9 |
| 10 | X3_10 | | (+)RP | RP | RP | RP | RP | Useful signal #10 |
| 11 | X3_11 | | (+)RP | (+)RP | (+)RP | (+)RP | RP | Useful signal #11 |
| 12 | X3_12 | | (+)RP | (+)RP | (+)RP | (+)RP | RP | Useful signal #12 |
| 13 | X3_13 | Negative stuff locations (-) (4 bytes) Useful signal #i 105 (i ∈ [1,...,16]) as a function of the MFI | (+)RP | (+)RP | (+)RP | (+)RP | RP | Useful signal #13 |
| 14 | X3_14 | | (+)RP | RP | RP | RP | RP | Useful signal #14 |
| 15 | X3_15 | | (+)RP | (+)RP | (+)RP | (+)RP | RP | Useful signal #15 |
| 16 | X3_16 | | (+)RP | (+)RP | (+)RP | (+)RP | RP | Useful signal #16 |

16 parallel rows

FIG. 6

| Bit # | 7 | 6 | 5 | 4 | 3 | 2 | 1 | 0 |
|---|---|---|---|---|---|---|---|---|
| | MFI<br>CRA | CRA<br>EDC | EDC | SAI | RAE | | | |
| Byte # X3_9 | $M_3$ | $C_1$ | $E_3$ | $S_3$ | $R_{15}$ | $R_{11}$ | $R_7$ | $R_3$ |
| Byte # X3_10 | $M_2$ | $C_0$ | $E_2$ | $S_2$ | $R_{14}$ | $R_{10}$ | $R_6$ | $R_2$ |
| Byte # X3_11 | $M_1$ | $E_5$ | $E_1$ | $S_1$ | $R_{13}$ | $R_9$ | $R_5$ | $R_1$ |
| Byte # X3_12 | $M_0$ | $E_4$ | $E_0$ | $S_0$ | $R_{12}$ | $R_8$ | $R_4$ | $R_0$ |

FIG. 7

| Position | 5 | 4 | 3 | 2 | 1 | 0 |
|---|---|---|---|---|---|---|
| Meaning | MFI | | CRA | Protective information bits | | |
| HC | $M_3$ | $M_1$ | $C_0$ | $E_4$ | $E_3$ | $E_1$ |

FIG. 8

| Position | 5 | 4 | 3 | 2 | 1 | 0 |
|---|---|---|---|---|---|---|
| Meaning | MFI | | CRA | Protective information bits | | |
| HC | $M_2$ | $M_0$ | $C_1$ | $E_5$ | $E_2$ | $E_0$ |

FIG. 9

| Bit # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Meaning | Parity | | Rate matching extension RAE | | | | | | | | | | | | | |
| | $P_1$ | $P_0$ | $R_{13}$ | $R_{12}$ | $R_{11}$ | $R_{10}$ | $R_9$ | $R_8$ | $R_7$ | $R_6$ | $R_5$ | $R_4$ | $R_3$ | $R_2$ | $R_1$ | $R_0$ |

DIGITAL DATA TRANSMISSION SYSTEM

CROSS-REFERENCE TO RELATED APPLICATION

This application claims priority of European Patent Application No. 00111539.3, which was filed on May 30, 2000.

BACKGROUND OF THE INVENTION

1. Field of the Invention

The invention relates to a data transmission system and a method, in particular for frame-oriented digital data transmission of a plurality of useful signals embedded in a carrier signal, using time-division multiplex operation, rate matching being undertaken between at least one useful signal and the carrier signal by means of stuff locations.

2. Description of the Prior Art

The importance of digital data transmission for the information society of the 21st Century is increasing strongly. Important applications for this are, for example, voice and data transmission in telecommunication networks and via the Internet. A major part of digital data transmission is presently accomplished by means of optical signals via optically conducting fibres, since transmission via an optical channel (OCh) generally permits higher data rates than transmission of electric signals via metallic conductors.

Standards are defined by the International Telecommunication Union (ITU) in order to ensure compatibility of the data formats between different users in a network. Frequently used standards are the ITU-T G.813, ITU-T G.958, ITU-T G.825, ITU-T G.707 and ITU-T G.975 Standards, which are hereby rendered in full measure the subject matter of the disclosure of this description. A flexible data format is achieved by virtue of the fact that the data are embedded in frames which typically contain an overhead and useful data sections (payload envelope). The useful data to be transmitted are embedded in the useful data sections. The overhead serves in this case, inter alia, for transmitting control information. Regarding the processing of overheads of optical channels in the case of frame-oriented data transmission via optical channels, reference may also be made to Ballintine, J. E. "Data Format and Generic Processing for OCh-OH" , wave star, volume 420.200.11, issue 1.0, which printed publication is hereby rendered in full measure the subject matter of the disclosure of this description.

In order to transmit a plurality of useful signals (clients) via the same physical channel, the useful signals are typically multiplexed. For example, four useful signals or secondary streams with data rates of respectively 2.488 gigabits per second (Gbit/s) (≈2.5 Gbit/s) are mapped into a carrier signal (server) of approximately 10.7 Gbit/s using time-division multiplex operation. Known data hierarchies typically used for this purpose are the synchronous digital hierarchy (SDH) and the synchronous optical network (SONET).

In these known transmission systems in accordance with SDH or SONET, data are typically transmitted by means of synchronous transport modules (STM). A synchronous transport module contains a dedicated STM section overhead (STM-SOH) and a useful data area in which virtual containers with useful data are embedded.

A central problem in digital data transmission is the handling of different data rates between the useful signals (clients) and the carrier signal. For example, if the rate of the useful signal is higher than the rate of the carrier signal, excess data must be stored as stuff bytes in stuff locations (negative stuff opportunities) in order to achieve rate matching. For this purpose, each synchronous transport module in the STM section overhead contains three stuff bytes for rate matching. In order to locate the start of the virtual container, which start can be displaced by the stuffing, there is, moreover, located in the section overhead of each synchronous transport module a pointer which points as start value to the first byte of the virtual container and is decremented or incremented during stuffing.

In the transmission of the synchronous transport modules in accordance with SDH or SONET, stuff locations are therefore reserved inside each STM section overhead. This method proves, however, to be disadvantageous, since, with reference to the selected example (4×2, 5G→10G), a stuffing area for each of the four useful signals is reserved in each OCh frame and reassigned in the receiver, something which is associated with a high degree of processing complexity and therefore requires a high and cost intensive outlay on hardware and software.

Moreover, in transmission using so-called STM-N/OC-M multiplexers (which operate according to the ITU-T G. 707 Standard), the STM section overhead (STM-SOH) is always truncated. The said hierarchies are therefore data-transparent and time-transparent only with reference to the administrative data units, that is to say with reference to the administrative units, AU-x data units of the synchronous digital hierarchy, and with reference to the equivalent data units of the synchronous optical network. The original timing and the STM section overhead are not transmitted. Consequently, the synchronous digital hierarchy and the synchronous optical network are not completely data-transparent and time-transparent, that is to say bit-for-bit data preservation is not ensured during transmission. As a result, inter alia the outlay on hardware and software is increased, since it may be necessary to generate a new overhead in the receiver.

Moreover, it is desirable also to transmit data signals whose data rate is known although their data structure is unknown. Such data signals are denoted as clear-channel signals. Examples of such clear-channel signals are signals in accordance with the Ethernet standard or the Internet protocol (IP).

When such a clear-channel signal is to be transmitted by means of a transmission system which operates in accordance with the synchronous digital hierarchy, it is firstly translated into the structure of the synchronous digital hierarchy, that is to say the signal is transmitted neither in a data-transparent nor in a time-transparent fashion. Moreover, this translation requires a high degree of processing complexity and thereby necessitates high costs.

One object of the invention is therefore to make available a transmission system and/or a method of the type mentioned at the beginning, which avoid or at least reduce the disadvantages of the prior art.

A further object of the invention is to make available a transmission system and/or a method which make available data-transparent and/or time-transparent transmission, in particular of data signals in accordance with the synchronous digital hierarchy, the synchronous optical network or clear-channel signals.

A further object of the invention is to make available a transmission system and/or a method which cause a lesser degree of complexity and a lower outlay on costs.

A further object of the invention is to make available a transmission system and/or a method which permit reliable data transmission at a low bit error rate.

SUMMARY OF THE INVENTION

In the transmission system according to the invention, at least one first useful signal (client) is mapped into a carrier signal using time-division multiplex operation, for example sections of the useful signal are transmitted sequentially in time. Use is made of frame-oriented transmission of the digital data, the data to be transmitted being embedded in a superframe of the carrier signal, which superframe preferably comprises a plurality of, for example, four frames according to the ITU-T G.975 Standard, or is essentially composed thereof. According to the invention, useful data of the first useful signal are embedded in useful data sections, in particular predetermined useful data sections of a first superframe. If, for example, the rate of the useful data of the first useful signal is higher than the rate of the carrier signal, excessive components of the useful data of the first useful signal are embedded for transmission in stuff locations which are reserved in the superframe. Furthermore, indicator data can be embedded in the first superframe and are transmitted therewith. Using the indicator data, it is possible once again to assign the components, embedded in the stuff locations, of the useful data of the first useful signal with the latter.

Rate matching of the first useful signal with the carrier signal is achieved by embedding excess data, preferably bits or bytes.

The transmission system according to the invention advantageously permits direct bit-for-bit transmission of the data, in particular of STM signals or useful data, that is to say permits time-transparent and data-transparent transmission of the overall data stream. The signal can be reconstituted in a bit-for-bit fashion after demultiplexing, just as it was previously multiplexed. The transmission system can therefore advantageously transmit a multiplicity of signals of known, but also, in particular, of unknown data structure, for example clear-channel signals, and is therefore also well suited for future applications. Furthermore, in particular, the frame structure of the useful signal is retained during transmission and recovered in the receiver.

Moreover, the outlay for truncating the overhead of signals in accordance with the synchronous digital hierarchy or the synchronous optical network both in the hardware and in the software is lower than in the case of previously known systems, and this yields a saving in costs.

The transmission system according to the invention is suitable, in particular, for optical data transmission, for example via optically conducting fibres. Transmission by means of an optical channel (OCh) preferably takes place in accordance with ITU-T G.975 Standard. The latter defines a frame structure which comprises an overhead, a useful data section (regular payload, RP) and a section for forward error correction (FEC).

It is preferred for a plurality of, for example four frames to be combined to form a superframe, and for four bytes to be reserved as stuff locations in only one of the four frames, in particular in the temporary third frame of each superframe. A further four bytes for the indicator data and further control data are then provided in the same frame, the indicator data themselves occupying at most four bits. Furthermore, a plurality of, for example four or sixteen superframes for transmitting four or sixteen, respectively, useful signals are combined to form a multiframe. Such a virtual channel is also denoted as a "digital wrapper". Reference may be made in this connection to Ballintine, J. E. "Data Format and Generic Processing for OCh-OH", wave star volume 420.200.11, issue 1.0.

It is preferred for useful data of each useful signal not to be stuffed in every multiframe. In particular, a maximum of or exactly one useful signal is stuffed in each multiframe for rate matching, and an item of assigning information or a multiframe indicator is embedded in relation to the stuffed useful signal into the carrier signal, in particular into the path layer overhead of the carrier signal.

If, for example, four useful signals are multiplexed or mapped, this means that, in temporal sequence, useful data of the first useful signal are stuffed in an ith superframe, useful data of the second useful signal are stuffed in an (i+1)th superframe, useful data of the third useful signal are stuffed in an (i+2)th superframe, useful data of the fourth useful signal are stuffed in an (i+3)th superframe, in turn useful data of the first useful signal are stuffed in an (i+4)th superframe, etc., and that indicator data for reassigning the stuffed useful data relative to the associated useful signal are provided in each superframe. In the four-fold case, a multiframe is composed respectively of the superframes i, i+1, i+2 and i+3. In the sixteen-fold case, a multiframe is correspondingly composed of superframes i to i+15. This structuring has the advantage that only useful data of precisely only one useful signal are stuffed in each superframe, thus achieving a low complexity in processing and reassigning.

The indicator data are preferably stored in the overhead of one of the frames in the superframe. In this case, it is preferable according to the invention for at most eight bytes for the indicator data to be occupied together with the stuff locations, and previously unused bytes in the path layer overhead or path overhead are used as stuff locations and for the indicator data. The use of already existing and previously unused storage positions or bytes is particularly advantageous, since the data rate of the virtual digital wrapper channel used is not increased.

In a further advantageous development of the invention, the excess useful data to be stuffed are temporarily stored in the transmitter and not embedded into the superframe and transmitted until one or four bytes to be stuffed are accumulated. This also achieves a substantial simplification in hardware and software.

Since the indicator data for the reassignment to the useful signal are of great importance, a bit error in the indicator data would have an extremely negative effect. In the most unfavourable case, the entire associated useful signal could no longer be used in the corresponding multiframe. Consequently, the indicator data are preferably coded redundantly. A particularly advantageous coding method uses a so-called Hamming code. The Hamming code is additionally applied to an already known Reed-Solomon coding (RS coding), the result being to ensure a particularly high security against bit errors, that is to say an extremely low bit error ratio (BER) is ensured.

It remains to be mentioned at this juncture that, unless expressly denoted as temporary first, second, third, fourth, no temporal sequence is fixed by first, etc., but a reference point is created for distinguishing.

The invention is explained in more detail below with the aid of exemplary embodiments and with reference to the drawings.

BRIEF DESCRIPTION OF THE DRAWINGS AND TABLES

In the drawings:

FIG. 1 shows the structure of a superframe, comprising four OCh frames in accordance with the ITU-T G.975 Standard, FIG. 2 shows various mapping examples of useful signals in a multiframe of a carrier signal, comprising sixteen OCh superframes in accordance with FIG. 1, FIG. 3 shows a detail of the structure of the temporary third frame in accordance with FIG. 1, in the case of mapping of four useful signals in a carrier signal, FIG. 4 shows a detail of the structure of the temporary third frame in accordance with FIG. 1, in the case of mapping of sixteen useful signals in a carrier signal, FIG. 5 shows a detail of the structure of the temporary third frame in accordance with FIG. 1, in the case of mixed mapping of thirteen useful signals in a carrier signal, FIG. 6 shows an arrangement of the four path layer overhead bytes X3_9 to X3_12 of the optical channel, in which the stuff location management information is stored, FIG. 7 shows the composition of a first Hamming code word HC(6,3,3) for protecting the bits $M_3$, $M_1$ and $C_0$, FIG. 8 shows the composition of a second Hamming code word HC(6,3,3) for protecting the bits $M_3$, $M_1$ and $C_0$, and FIG. 9 shows the bit structure of the 16-bit rate matching extension.

Furthermore, in the tables:

Table 1 shows the multiframe indicator for the mapping examples according to FIG. 2 between the useful signals and the OCh superframes, Table 2 shows the lengths of period of the OCh superframes and OCh multiframes for the mapping examples according to FIG. 2, Table 3 shows the significance of the two control bits for the rate matching $C_0$ and $C_1$, Table 4 shows the table of assignment between the 3-bit syndrome s and the derived error correction pattern c, Table 5 shows the bit error ratio (BER) of the section layer of the optical channel (OCh) before and after the Reed-Solomon (RS(255,239,217)) decoding, Table 6 binomial probabilities for different numbers of bit errors in an HC code word after the RS decoding and before the HC decoding, Table 7 shows bit error probabilities and the mean time between the bit errors, and Table 8 shows supported values of the signalling and alarm indicator (SAI) ($S_3$ to $S_0$) for a special useful signal.

DETAILED DESCRIPTION OF THE INVENTION

The embodiments explained below relate by way of example to the regular superimposition of 4 useful signals (clients) (4×2.5 Gbit/s→10 Gbit/s or 4×10 Gbit/s→40 Gbit/s) or 16 useful signals (16×2.5 Gbit/s→40 Gbit/s) and to the mixed superimposition of 13 useful signals (12×2.5 Gbit/s+1×10 Gbit/s→40 Gbit/s) in relation to one carrier signal (server) in each case. Rate matching is provided by means of stuff locations 105. The exemplary embodiment operates according to the ITU-T G.975 Standard. With reference to FIG. 1, four of the OCh frames (frame #1 to frame #4) defined by the ITU-T G.975 Standard are combined to form one OCh superframe #1. Each OCh frame or frame contains an overhead OH, a section for embedding useful data (payload envelope) and a section for the forward error correction FEC. The data rates 10 Gbit/s and 40 Gbit/s for the carrier signal relate to the useful data rate. The data rates for the overall frame structure are approximately 10.66 Gbit/s and 42.65 Gbit/s, respectively, owing to the addition of the OCh overhead and the forward error correction. In accordance with the frame structure used, the data are processed in a 16 byte (16 lines) parallel architecture. The following previously unused overhead bytes of the optical channel exist in this OCh superframe or superframe:

1. in the section layer overhead of the optical channel OCh-SOH, three previously unused bytes: X2_3, X2_4, X2_4 in frame #2
2. in the tandem connection layer overhead of the optical channel OCh-TCOH, three previously unused bytes: X2_14, X2_15, X2_16, in frame #2 and
3. in the path layer overhead of the optical channel OCh-POH, eight previously unused bytes: X3_9, X3_10, X3_11, X3_12, X3_13, X3_14, X3_15, X3_16 in frame #3.

Here, Xi_j denotes the jth byte of the overhead of the ith frame in the OCh superframe. Furthermore, it should be mentioned at this juncture that the section layer overhead of the optical channel OCh-SOH and the section overhead of a synchronous transport module STM-SOH are different.

Since the path layer overhead POH of the optical channel is truncated in each section, and the tandem connection layer overhead TCOH is truncated as soon as a tandem connection (TC) is produced, these bytes are not suitable for storing rate matching information. Consequently, the path layer overhead of the optical channel OCh-POH is used for the rate matching. Owing to the use of the overhead bytes of the optical channel, the network operator is capable of transmitting both OC-48 signals and clear-channel signals at an OC-48 rate.

Application of a Multiframe Structure

The superframe system or method described uses a multiframe structure which is composed of 16 OCh superframes, as they are illustrated in FIG. 1. According to the invention, a specific useful signal is stuffed in a specific superframe SF of the optical channel OCh, and management information for the stuff operation is processed. The assignment for the mapping examples 4×2.5 Gbit/s→10 Gbit/s (Modulo 4 mapping)
4×10 Gbit/s→40 Gbit/s (Modulo 4 mapping)
16×2.5 Gbit/s→40 Gbit/s (Modulo 16 mapping)
a×2.5 Gbit/s+b×10 Gbit/s→10 Gbit/s (mixed mapping)

is illustrated in FIG. 2. It is evident to the person skilled in the art in this case that these examples are to be understood only as exemplary. The transmitted carrier signal also contains a continuous sequence of an arbitrary number of multiframes, with the result that the frame structure is repeated arbitrarily along the carrier signal. Each multiframe MF (multiframe) contains a sequence of 16 OCh superframes with the numbering i, i+1, . . . , i+15. Correspondingly, a multiframe indicator MFI, that is to say an indication value MFI ∈ [0, 1, . . . , 15] belongs to each OCh superframe. The signal section 101 shows a first possibility for regular mapping of four useful signals in a carrier signal. In this case, either 4 useful signals #1, #2, #3, #4 are mapped or superimposed at a rate of 2.5 Gbit/s into a carrier signal of 10 Gbit/s, or 4 useful signals #1, #2, #3, #4 are mapped or superimposed at 10 Gbit/s into a carrier signal of 40 Gbit/s. Signal section 102 shows the regular mapping of 16 useful signals #1 to #16 at 2.5 Gbit/s into a carrier signal of 40 Gbit/s, and signal section 103 shows the mixed mapping of 12 useful signals #1, #3, #4, #5, #7, #8, #9, #11, #12, #13, #15, #16, at 2.5 Gbit/s, and of one useful signal #2 of 10 Gbit/s into a carrier signal of 40 Gbit/s. The sequence of 4 useful signals is repeated correspondingly four times in the superimposition of 4 useful signals, in order to fill up a multiframe MF. It is evident that in the case of the 16 superframes used per multiframe MF the multiframe indicator MFI must have at least 16 values, for which reason it is represented by a 4-bit number. In cases in which only 4 useful signals, as illustrated in signal section 101, are present, only the last 2 bits of the multiframe indicator MFI are interpreted as an assignment indicator for the useful signal, that is to say the residue of a modulo 4 inspection is used.

Table 1 shows the binary representation of the multiframe indicator MFI, composed of the bits $M_3$, $M_2$, $M_1$, $M_0$ in the first four columns. The fifth column shows the number of the useful signal for the case in which 4 useful signals are superimposed in a carrier signal (corresponding to the signal section 101). Column 6 shows the useful signal numbering for the case in which 16 useful signals are superimposed in a carrier signal (corresponding to signal section 102), and column 7 shows the mixed superimposition of 12 signals at 2.5 Gbit/s and one signal at 10 Gbit/s in a carrier signal of 40 Gbit/s (corresponding to signal section 103). Column 8 shows the number of the multiframe MF beginning with the starting value i.

TABLE 1

| Multiframe indicator MFI | | | | Description | | | |
|---|---|---|---|---|---|---|---|
| | | | | 4 × 2.5 G → 10 G | 16 × 2.5 G + | a × 2.5 G + | OCh |
| $M_2$ | $M_3$ | $M_1$ | $M_0$ | 4 × 10 G → 40 G | 40 G | b × 10 G → 40 G | MF# |
| 0 | 0 | 0 | 0 | Useful signal #1 | Useful signal #1 | Useful signal #1 (2.5 G) | i |
| 0 | 0 | 0 | 1 | Useful signal #2 | Useful signal #2 | Useful signal #2 (10 G) | i + 1 |
| 0 | 0 | 1 | 0 | Useful signal #3 | Useful signal #3 | Useful signal #3 (2.5 G) | i + 2 |
| 0 | 0 | 1 | 1 | Useful signal #4 | Useful signal #4 | Useful signal #4 (2.5 G) | i + 3 |
| 0 | 1 | 0 | 0 | Useful signal #1 | Useful signal #5 | Useful signal #5 (2.5 G) | i + 4 |
| 0 | 1 | 0 | 1 | Useful signal #2 | Useful signal #6 | Useful signal #2 (10 G) | i + 5 |
| 0 | 1 | 1 | 0 | Useful signal #3 | Useful signal #7 | Useful signal #7 (2.5 G) | i + 6 |
| 0 | 1 | 1 | 1 | Useful signal #4 | Useful signal #8 | Useful signal #8 (2.5 G) | i + 7 |
| 1 | 0 | 0 | 0 | Useful signal #1 | Useful signal #9 | Useful signal #9 (2.5 G) | i + 8 |
| 1 | 0 | 0 | 1 | Useful signal #2 | Useful signal #10 | Useful signal #2 (10 G) | i + 9 |
| 1 | 0 | 1 | 0 | Useful signal #3 | Useful signal #11 | Useful signal #11 (2.5 G) | i + 10 |
| 1 | 0 | 1 | 1 | Useful signal #4 | Useful signal #12 | Useful signal #12 (2.5 G) | i + 11 |
| 1 | 1 | 0 | 0 | Useful signal #1 | Useful signal #13 | Useful signal #13 (2.5 G) | i + 12 |
| 1 | 1 | 0 | 1 | Useful signal #2 | Useful signal #14 | Useful signal #14 (10 G) | i + 13 |
| 1 | 1 | 1 | 0 | Useful signal #3 | Useful signal #15 | Useful signal #15 (2.5 G) | i + 14 |
| 1 | 1 | 1 | 1 | Useful signal #4 | Useful signal #16 | Useful signal #16 (2.5 G) | i + 15 |

As illustrated in FIG. 2 and Table 1, each superframe SF is assigned exactly one useful signal. In this assigned superframe, stuff locations 105 are now provided for rate matching of the relevant useful signal. These stuff locations 105 are also noted as negative stuff opportunities. FIG. 3 shows the arrangement of the data in the overhead OH and a 5-byte section SPE from the useful data section of the temporary third frame of a superframe. The OCh frame is designed for a parallel architecture of 16 rows. The first 8 rows of the overhead OH are the bytes X3_1 to X3_8.

These 8 bytes already contain regular data of the path layer overhead of the optical channel. According to the invention, the rows 9 to 12 of the overhead OH (bytes X3_9 to X3_12) contain the stuff monitoring management information 104 for the ith useful signal, which also comprises the multiframe indicator MFI. In this case, according to Table 1 the value of the indicator MFI depends on the number of the useful signal, which is assigned to a specific superframe SF. The rows 13 to 16 of the overhead OH (four bytes X3_13 to X3_16) contain the stuff locations 105 or negative stuff opportunities. Exactly one useful signal is stuffed in each superframe, and the assignment of the stuff locations 105 to the associated useful signal is reconstituted after the transmission by means of the multiframe indicator MFI. Columns 2 to 6 show a section of the useful data blocks RP (regular payload) in which the main part of the useful data are stored. The bracketed plus sign in the second column symbolizes that the bytes are used as positive stuff opportunities, that is to say when the rate of the useful signal is less than the rate of the carrier signal predetermined values are stored here instead of the useful data.

FIG. 4 shows, in correspondence to FIG. 3, a section of the temporally third frame in the superframe for the superimposition of 16 useful signals in a carrier signal in accordance with column 6 in Table 1. FIG. 5 shows a corresponding illustration for the mixed superimposition of 13 useful signals in accordance with column 7 in Table 1.

As illustrated in FIGS. 3 to 5, for a predetermined useful signal #i $N_s$=4 stuff bytes (X3_13 to X3_16) for the negative stuff are reserved in a predetermined superframe of the optical channel. In order to render the stuff as simple as possible, excess useful data are temporarily stored and not stuffed until one or four bytes which are to be completely stuffed come together.

The maximum frequency deviation to be mastered between a useful signal and the carrier signal and which can still be compensated by stuffing is calculated below. The frequency deviation which can be processed is essentially determined by the number of available stuff bytes $N_s$. In principle, the processable frequency deviation $\Delta f_0$ can be expressed by the following equation:

$$\Delta f_0 = N_s / N_{OCh}$$

$N_s$=4 and $N_{OCh}$ being the number of the useful data bytes. Furthermore, the number of the bytes per useful signal in an OCh superframe SF is:

$$N_{OCh;\ SF} = 4 \times 238 \times 4 = 3808$$

and the number of the bytes of a useful signal (modulo 4 alternative) per multiframe MF is:

$$N_{OCh;\ MF} = N_{OCh;\ SF} \times 4 = 15232.$$

Thus, the maximum processable frequency deviation for four stuff bytes is:

$$\Delta f_{0.4\ byte} = N_s / N_{OCh;\ MF} = 1 / N_{OCh;\ SF} = 262\ \text{ppm}.$$

This value holds for all described mapping examples. A comparison of the period durations is illustrated in Table 2 for various input and output data rates.

TABLE 2

| Application: Useful signal | Application: Carrier signal | Period of the OCh super-frame $T_{SF}$ | Period duration of the OCh multi-frame (4 bit MFI) $T_{MF}$ | Number of the stuff bytes per useful signal in an OCh multiframe $N_S$ | Ratio R = $(T_{MF}/T_{SF})$ × (useful signal/carrier signal) |
|---|---|---|---|---|---|
| 2.5 G | 10 G | 12.24 μs | 48.96 μs | 4 | $C_1$ = const. = 1 |
| 2.5 G | 40 G | 3.06 μs | 48.96 μs | 4 | $C_2$ = const. = 1 |
| 10 G | 40 G | 3.06 μs | 12.24 μs | 4 | $C_3$ = const. = 1 |

Since the ratio R is constant, the value $\Delta f_0$ is valid for all mapping examples described.

Control for the Data Matching

Two bits are provided per useful signal for the purpose of controlling the stuffing. The meaning of the values of the stuff control bits $C_0$ and $C_1$ is illustrated in Table 3. Here, positive stuff means that the rate of the useful signal is less than the rate of the carrier signal, with the result that not all useful data positions are occupied in the superframe. Negative stuff is required when the rate of the useful signal is higher than the rate of the carrier signal, with the result that the useful data areas of the superframe do not suffice to accommodate all bits of the corresponding useful signal. The excess bits are then temporarily stored in the transmitter until 4 bytes have come together, since stuffing is done in a 4-byte fashion.

TABLE 3

| Stuff control bits: $C_1$ | Stuff control bits: $C_0$ | Description |
|---|---|---|
| 0 | 0 | "0": No stuff |
| 0 | 1 | "+1": Positive stuff |
| 1 | 0 | No stuff |
| 1 | 1 | "−1": Negative stuff |

Error Detection and Error Correction

It is decisive for the rate matching according to the invention that the stuff control information, that is to say the stuff control bits $C_1$, $C_0$ and the multiframe indicator MFI are reliable at all times. Otherwise, the desynchronizer of each specific useful signal loses its phase alignment, and the useful signal is destroyed for the corresponding multiframe.

A simple and simultaneously effective approach is for the rate matching management information 104, that is to say the multiframe indicator data MFI, the stuff control bits CRA, the signalling and alarm bits SAI and further phase information to be arranged as is illustrated in FIG. 6. FIG. 6 shows the path layer overhead bytes X3_9 to X3_12 in which the stuff management information 104 is stored and broken down according to its bits. The arrangement starts with the most significant bit. The 4 bytes X3_9 to X3_12 are subdivided as follows into 5 sections.

1. Multiframe indicator MFI
2. Control information for the rate matching CRA
3. Error detection and correction EDC
4. Signalling and alarm indication SAI
5. Rate matching extension RAE.

This arrangement is particularly advantageous, since the layer of the optical channel is already protected by a byte-multiplexed Reed-Solomon coding (RS(255, 239, 17) coding) which is known to the person skilled in the art. It is evident to the person skilled in the art that the multiframe indicator MFI also achieves an assignment of the control information for the rate matching CRA, the error detection and correction data EDC, the signalling and alarm indication SAI and the rate matching extension RAE to the associated useful signal.

In addition to the error correction abilities of the Reed-Solomon coding, which is used for the optical channel layer, Hamming coding (HC coding) is also applied to the stuff control information, that is to say to the MFI and CRA.

The applied error correction code ECC is applied as a doubly interleaved abbreviated Hamming code HC(6,3,3) for the error detection and correction EDC. It holds for the HC coding that:

n=6 (length of the code word)
k=3 (length of the message)
m=n−k=3 (number of the control or monitoring bits)
$d_{min}$=3 (minimum bit error spacing)
$t_{correct}$=1 (error correction ability)
$t_{detect}$=0 (additional error detection ability).

This coding is able to correct an individual bit error, but cannot simultaneously detect further errors. The generator matrix G of the HC coding used is:

$$G=\begin{bmatrix}1&0&0&0&1&1\\0&1&0&1&0&1\\0&0&1&1&1&0\end{bmatrix}, \tag{1}$$

the associated transposed parity check matrix $H^T$ is $$H^T=\begin{bmatrix}0&1&1\\1&0&1\\1&1&0\\1&0&0\\0&1&0\\0&0&1\end{bmatrix} \text{ and} \tag{2}$$

the associated decoder matrix D is $$D=\begin{bmatrix}1&0&0\\0&1&0\\0&0&1\\0&0&0\\0&0&0\\0&0&0\end{bmatrix}. \tag{3}$$

The following terms represent vectors, or matrices of dimension [a×b], a being the number of rows and b the number of columns. It holds that:

| | |
|---|---|
| $v = (v_2, v_1, v_0)$ | (message, [1 × 3]) |
| G | (generation matrix, [3 × 6]) |
| $y = (y_5, y_4, y_3, y_2, y_1, y_0) = v \otimes G$ | (code word, [1 × 6]) |
| $e = (e_5, e_4, e_3, e_2, e_1, e_0)$ | (error vector in accordance with AWGN channel, [1 × 6]) |
| $r = (r_5, r_4, r_3, r_2, r_1, r_0)$ | (received faulty code |

-continued

| | |
|---|---|
| $= y \oplus e$ | vector, according to AWGN channel, [1 × 6]) |
| $H^T$ | (parity check matrix, [6 × 3]) |
| $s = (s_2, s_1, s_0) = r \otimes H^T$ | (syndrome, [1 × 3]) |
| $c = (c_5, c_4, c_3, c_2, c_1, c_0)$ | (error correction pattern, determined by the syndrome, [1 × 6]) |
| D | (decoder matrix, [6 × 3]) |
| $u = (u_2, u_1, u_0) = (r \oplus c) \otimes D$ | (decoded receved message, [1 × 3]). |

The detection and correction now depend on the calculated syndrome, two distinctions being made here:

1. The syndrome is equal to zero, which is interpreted to the effect that a valid code vector has been received, and that therefore there is no need for error correction, that is to say it is assumed that no error is present.
2. The syndrome is not equal to zero, in which case it is assumed that an individual bit error is present and can be corrected.

Table 4 shows the assignment between the syndrome vector s and the derived error correction pattern c.

TABLE 4

| Syndrome s | | | Derived error correction pattern c | | | | | |
|---|---|---|---|---|---|---|---|---|
| $s_2$ | $s_1$ | $s_0$ | $c_5$ | $c_4$ | $c_3$ | $c_2$ | $c_1$ | $c_0$ |
| 0 | 0 | 0 | 0 | 0 | 0 | 0 | 0 | 0 |
| 0 | 1 | 1 | 1 | 0 | 0 | 0 | 0 | 0 |
| 1 | 0 | 1 | 0 | 1 | 0 | 0 | 0 | 0 |
| 1 | 1 | 0 | 0 | 0 | 1 | 0 | 0 | 0 |
| 1 | 0 | 0 | 0 | 0 | 0 | 1 | 0 | 0 |
| 0 | 1 | 0 | 0 | 0 | 0 | 0 | 1 | 0 |
| 0 | 0 | 1 | 0 | 0 | 0 | 0 | 0 | 1 |

Table 5 further shows eight different bit error ratios before and after the Reed-Solomon coding/decoding, but before the HC decoding. The first numerical value, that is to say a bit error ratio of $10^{-3}$, is the "worst case".

TABLE 5

| Bit error ratio before the HC decoding | |
|---|---|
| without RS FEC (before the RS decoding) | with RS FEC (after the RS decoding) |
| $10^{-3}$ | $5.0 \times 10^{-5}$ |
| $5.0 \times 10^{-4}$ | $1.0 \times 10^{-6}$ |
| $2.0 \times 10^{-4}$ | $2.0 \times 10^{-9}$ |
| $10^{-4}$ | $2.0 \times 10^{-13}$ |
| $10^{-5}$ | $6.3 \times 10^{-24}$ |
| $10^{-6}$ | $6.4 \times 10^{-33}$ |
| $10^{-7}$ | $1.0 \times 10^{-40}$ |

After the Reed-Solomon (RS) decoding, a bit error ratio BER of approximately $P_{OCh,RS}=5\times10^{-5}$ is obtained from the $10^{-3}$. Since the number of bits in a frame of the optical channel, which is protected by the RS coding, is $N_{OCh}=16\times8\times255=32648$, a mean number of faulty bits in a frame of the optical channel is obtained as:

$$N_{OCh,err}=N_{OCh}\times P_{OCh,RS}=32638\times5\times10^{-5}=1.6424$$

thus less than two.

The simplifying, but justified approximation is made below that the errors have a binomial distribution. The binomial distribution for the probability of k bit errors in a Hamming code word of length 6 bits ($N_{HC}=6$) with a bit error ratio or a bit error probability $P_{err}$ is $$B(N_{HC}, k, P_{err}) = \binom{N_{HC}}{k} \cdot P_{err}^k \cdot (1 - P_{err})^{N_{HC}-k} \quad (4)$$

Moreover, Table 6 shows by way of example some probabilities for selected bit error ratios of the optical channel. In the table, column 1 shows the bit error ratio after RS decoding, column 2 shows the binomial distribution for the case k=0, column 3 shows the binomial probability for the case k>0, column 4 shows the case k>1 and column 5 k<1, in each case after the RS coding/decoding but before the HC decoding inside a Hamming code word. Since the Hamming coding/decoding can be used to correct up to one error per code word, the fifth column (k>1) shows the probability for the case that the Hamming coding/decoding does not lead to the desired success, that is to say the errors cannot be corrected.

TABLE 6

Probability for a specific number of bit errors [mathematical relationship] in a Hamming code word

| $P_{OCh,RS}$ (BER after the RS decoding) | 1 − [>0] [0] "no errors" | [>0] [1,2,3,4,5,6] "one or more errors" | 1 − [>1] [0,1] correctable "less than 2 errors" | [>1] [2,3,4,5,6] non-correctable "2 or more errors" |
|---|---|---|---|---|
| 1.00E−03 | 9.94014980E−01 | 5.98501999E−03 | 9.99985040E−01 | 1.49600450E−05 |
| 1.00E−04 | 9.99400150E−01 | 5.99850020E−04 | 9.99999850E−01 | 1.49960004E−07 |
| 5.00E−05 | 9.99700037E−01 | 2.99962502E−04 | 9.99999963E−01 | 3.74950002E−08 |
| 1.00E−05 | 9.99940001E−01 | 5.99985000E−05 | 9.99999999E−01 | 1.49995971E−09 |
| 1.00E−06 | 9.99994000E−01 | 5.99998500E−06 | 1.00000000E+00 | 1.50001123E−11 |
| 1.00E−07 | 9.99999400E−01 | 5.99999850E−07 | 1.00000000E+00 | 1.49658064E−13 |
| 1.00E−08 | 9.99999940E−01 | 5.99999987E−08 | 1.00000000E+00 | 1.77635684E−15 |
| 2.00E−09 | 9.99999988E−01 | 1.20000002E−08 | 1.00000000E+00 | 3.33066907E−16 |
| 1.00E−09 | 9.99999988E−01 | 1.19999995E−09 | 1.00000000E+00 | 2.22044605E−16 |
| 1.00E−10 | 9.99999999E−01 | 1.20000010E−09 | 1.00000000E+00 | 1.11022302E−16 |
| 2.00E−13 | 1.00000000E+00 | 1.19970700E−12 | 1.00000000E+00 | 2.22044605E−16 |

A non-correctable error occurs in the multiframe indicator MFI or in the control information for the rate matching CRA when an error remains in an HC code word after the HC decoding. The probability for a number of n errors in the code word #i is:

$$P_i\{X=n\} = P\{n,\#i\} = B(N_{HC}, P_{OCh,RS}, n)$$

Consequently, the probability of having no error in one of the two HC code words (after HC decoding) is:

$$\begin{aligned} P_{Ok} &= P_1\{X=0\} \cdot P_2\{X=0\} + \\ &\quad P_1\{X=0\} \cdot P_2\{X=1\} + \\ &\quad P_1\{X=1\} \cdot P_2\{X=0\} + \\ &\quad P_1\{X=1\} \cdot P_2\{X=1\} \end{aligned}$$

$$\begin{aligned} &= B(6, P_{OCh,RS}, 0) \cdot B(6, P_{OCh,RS}, 0) + \\ &\quad B(6, P_{OCh,RS}, 0) \cdot B(6, P_{OCh,RS}, 1) + \\ &\quad B(6, P_{OCh,RS}, 1) \cdot B(6, P_{OCh,RS}, 0) + \\ &\quad B(6, P_{OCh,RS}, 1) \cdot B(6, P_{OCh,RS}, 1) + \\ &= [B(6, P_{OCh,RS}, 0) \cdot B(6, P_{OCh,RS}, 1)]^2 + \end{aligned}$$

and the probability of a non-correctable error is:

$$P_{fail} = 1 - P_{Ok}.$$

A further investigated property of the transmission system and method according to the invention is the probability of a false stuffing decision. The following holds for the mean time between such a false decision and a disturbance, following thereupon, in the associated useful signal.

$N_{OCh}=81680$ OCh frames are transmitted in a period with a duration of one second. For the example illustrated in column 5 in Table 1 (modulo 4 mapping), it holds because of the time-slot multiplex method used that $N_{OCh,client} = N_{OCh}/4 = 20420$ OCh frames are transmitted per useful signal with stuff information relating to this special useful signal. It follows from this that the mean time between errors is $$MTBF = 1/(P_{fail} \cdot N_{OCh,client}).$$

Table 7 shows the mean time between errors MTBF for a selection of the bit error ratios BER shown in Table 6. The actual mean time between errors is shown even lower than in Table 7, since in calculating the table no distinction is made between errors in the MFI/CRA bits and the parity bits $E_0$ to $E_5$. An error in the parity bits is, however, unimportant. Column 1 of Table 7 shows the probability of a bit error before the RS decoding, column 2 shows the probability of a bit error after the RS decoding, column 3 shows the probability of the failure of the correction by means of the Hamming decoding, and column 4 shows the mean time, resulting from column 3, between remaining errors.

TABLE 7

| $P_{OCh,RS}$ (BER before the RS decoding) | $P_{OCh,RS}$ (BER after the RS decoding) | $P_{fail}$ "non correctable" at least 2 errors in one HC (6,3,3) code word before the HC decoding | MTBF "time between errors in the code words after correction by means of the HC (6,3,3) coding/decoding |
|---|---|---|---|
| 1.00E−03 | 5.00E−05 | 7.4990E−08 | > 10.88 min |
| 5.00E−04 | 1.00E−06 | 3.0000E−11 | > 18.89 days |
| 2.00E−04 | 2.00E−09 | 8.8818E−16 | > 1748 years |
| 1.00E−04 | 2.00E−13 | < 4.4409E−16 | > 3497 years |

With reference to the optical light wave system (OLS) system information (in accordance with the specification of Lucent Technologies), the bit error ratio in a OLS system must be smaller than $10^{-15}$ after and, consequently, smaller than $10^{-5}$ before the RS decoding. The 16-fold interleaved RS code can correct 8 symbols, and is therefore quite robust as regards error bursts, since it is capable of correcting error bursts of length N=16×8×8=1.024 bits. The required specifications with the transmission system and method according to the invention are thereby achieved. Nevertheless, error scenarios and appropriate means for alarm indication in the case of an error are described below together with the measures following therefrom.

The generation of the 6-bit long Hamming HC (6,3,3) code words (systematic coding) is represented in FIG. 7. Row 1 shows the bit position in the Hamming code word, the multiframe indicator values $M_3$ and $M_1$, respectively, being arranged in bits Nos. 5 and 4, and control information for the rate matching $C_0$ being arranged in bit No. 3. Protective information bits Nos. 2, 1 and 0 carry the error detection and correction information $E_1$, $E_3$, $E_4$. The second Hamming code word is illustrated in FIG. 8, and is constructed in a fashion similar to the first Hamming code word. In the sequence illustrated, it bears the data $M_2$, $M_0$, $C_1$, $E_5$, $E_2$ and $E_0$, starting with the most significant bit.

Furthermore, as shown in the fourth column of FIG. 6, four bits are used for the signalling and alarm indication SAI. These are denoted by $S_3$, $S_2$, $S_1$ and $S_0$. They bear the signalling information for each useful or secondary signal. Their meaning is shown in Table 8.

TABLE 8

| Signalling and alarm bits | | | | | |
|---|---|---|---|---|---|
| $S_3$ | $S_2$ | $S_1$ | $S_0$ | Meaning | Hex |
| 0 | 0 | 0 | 0 | OCI: Indication for open connection (that is to say unequipped) | 0 |
| 0 | 0 | 0 | 1 | Normal operating mode, OC-48 equipped (standard) | 1 |
| 0 | 0 | 1 | 0 | Normal operating mode, clear-channel equipped (with OC-48 rate) | 2 |
| 0 | 0 | 1 | 1 | Temporarily unused | 3 |
| 0 | 1 | 0 | 0 | Temporarily unused | 4 |
| 0 | 1 | 0 | 1 | Temporarily unused | 5 |
| 0 | 1 | 1 | 0 | Temporarily unused | 6 |
| 0 | 1 | 1 | 1 | Temporarily unused | 7 |
| 1 | 0 | 0 | 0 | Temporarily unused | 8 |
| 1 | 0 | 0 | 1 | Temporarily unused | 9 |
| 1 | 0 | 1 | 0 | Temporarily unused | A |

TABLE 8-continued

| Signalling and alarm bits | | | | | |
|---|---|---|---|---|---|
| $S_3$ | $S_2$ | $S_1$ | $S_0$ | Meaning | Hex |
| 1 | 0 | 1 | 1 | Temporarily unused | B |
| 1 | 1 | 0 | 0 | Temporarily unused | C |
| 1 | 1 | 0 | 1 | Temporarily unused | D |
| 1 | 1 | 1 | 0 | Temporarily unused | E |
| 1 | 1 | 1 | 1 | FDI: "Forward error indication" | F |

The temporarily unused signalling bits are reserved for future applications.

Furthermore, 16 bits are provided in the stuff management area for rate matching extension RAE, as is illustrated in the fifth to eighth columns (bits 3, 2, 1, 0) in FIG. 6. This rate matching extension RAE contains additional information on the short-period rate fluctuations (jitter) and the long-period rate fluctuations (wander), and ensures that these have good properties through known methods of digital signal processing. For this purpose, 16 bits are reserved in the overhead OH of each superframe. The illustration of these 16 bits is shown in FIG. 9.

The transmission system advantageously tolerates the following frequency deviations:

1. A maximum deviation in the data rate of the tributary $f_{Trib}$ (OC-48) (a deviation of ±20 ppm relates to the useful signal, and one of ±4.7 ppm relates to the local reference clock)

$$f_{Trib}<\pm 25 \text{ ppm}$$

2. and a maximum deviation in the transmit data rate $f_{OCh}$ (OCh-10G)

$$f_{OCh}<\pm 50 \text{ ppm.}$$

The ASIC ($J_G$) tolerates a jitter generation of a) $J_G$<0.01 $UI_{rms}$ (in accordance with ITU-T G.958, p. 13, Section 5.3.1, bandpass [12 kHz . . . 2 MHz]) and b) $J_G$<0.1 $UI_{pp}$ (in accordance with ITU-T G.813, Section 7.3, Option 2, bandpass [12 kHz . . . 2 MHz]).

It holds for a network element concatenation that $N_{MD}+N_{LR}\leqq 76$, $N_{MD}$ being the number of the multiplex-demultiplex combinations, and $N_{LR}$ being the number of optical translator units (OTU) in the line regenerator mode (LR). The jitter $J_{NEL}$, which is generated at the end of the chain, fulfils the following network limiting values a) $J_{NEL}$<0.15 $UI_{rms}$ (ITU-T G.825, Table 1, Section 3.1, [$f_3$ . . . $f_4$]=[1 MHz . . . 20 MHz]) and b) $J_{NEL}$<1.5 $UI_{PP}$ (ITU-T G.825, Table 1, Section 3.1, [$f_1$ . . . $f_4$]=[5 MHz . . . 20 MHz]).

The long-period frequency fluctuations (wander) fulfil the specifications TDEV (time deviation (wander)) and MTIE (mean time interval error (wander)) of the Telcordia GR-253 Core Standard (see FIGS. 5–17 or FIGS. 5–18 of the cited standard), which is hereby rendered in full measure the subject matter of the description.

With reference to FIG. 9, the bits $R_{13}$ to $R_0$ are interpreted as a whole number R in a two's complement representation. This number bears further phase information with reference to the corresponding useful signal.

The two parity bits $P_1$, $P_0$ have the same value P. The value P represents an even parity with reference to the bits $R_{13}$ to $R_0$.

The number of bytes which is reserved for the rate matching information is therefore equal to 8, which is composed of the 4 bytes for the stuff control management information 104 and the 4 stuff bytes. According to the invention, these 8 bytes are kept free in the path layer overhead of the optical channel in the temporally third OCh frame of each superframe, that is to say in the bytes X3_9 to X3_16.

It is evident to the person skilled in the art that the described advantageous embodiment of the invention is to be understood only in an exemplary fashion, and that modifications may be made therein without departing from the scope of the invention.

What is claimed is:

1. Transmission system for the frame-oriented transmission of digital data by means of a carrier signal using time-division multiplex operation, in which the carrier signal comprises at least one first useful signal (#1), and there are different data rates between the carrier signal and the first useful signal (#1), first useful data of the first useful signal (#1) can be embedded in useful data sections (RP) of a first superframe (SF), second useful data of the first useful signal (#1) can be embedded in stuff locations in the first superframe (SF) in order to achieve rate matching between the carrier signal and the first useful signal (#1), and first indicator data (MFI) can be embedded in the first superframe (SF), with the aid of which first indicator data (MFI) it is possible to assign the second useful data to the first useful signal (#1).

2. Transmission system according to claim 1, in which the carrier signal comprises at least one further second useful signal (#2), and there are different data rates between the carrier signal and the second useful signal (#2), third useful data of the second useful signal (#2) are embedded in the first superframe (SF) and fourth useful data of the second useful signal (#2) can be embedded in stuff locations in a second superframe (SF), in order to achieve rate matching between the carrier signal and the second useful signal, and second indicator data (MFI) are embedded in the second superframe (SF), with the aid of which second indicator data (MFI) the fourth useful data can be assigned to the second useful signal (#2).

3. Transmission system according to claim 2, in which the first, in particular each superframe (SF) comprises a plurality of frames, in particular four frames according to the ITU-T G.975 Standard.

4. Transmission system according to claim 3, in which the first, in particular each frame comprises an overhead (OH), and indicator data (MFI) are embedded in the overhead (OH), in particular in a path layer overhead (POH).

5. Transmission system according to claim 4, in which indicator data (MFI) for each useful signal (#1, #2, . . . , #16) are not contained in the first superframe (SF).

6. Transmission system according to claim 5, in which stuff locations (105) for useful data of each useful signal (#1, #2, . . . , #16) are not reserved in each superframe (SF).

7. Transmission system according claim 6, in which indicator data (MFI) for assigning useful data to only the first useful signal (#1) are embedded in the first superframe (SF).

8. Transmission system according claim 7, in which stuff locations (105) for useful data only of the first useful signal (#1) are reserved in the first superframe (SF).

9. Transmission system according claim 8, in which stuff locations (105) for useful data of at most one useful signal (#1) are reserved in each superframe (SF).

10. Transmission system according to claim 9, in which each superframe (SF), in particular the overhead (OH) of the temporary third frame in the superframe (SF), has stuff locations (105) and a region for embedding the indicator data (MFI).

11. Transmission system according to claim 10, in which a plurality of, in particular four or sixteen superframes (SF) are combined to form a multiframe (MF).

12. Transmission system according to claim 11, in which each useful signal (#1, #2, . . . , #16) can be assigned to a superframe of a multiframe (MF) by means of indicator data (MFI) which are embedded in the superframe, and stuff locations (105) for only the assigned useful signal are provided in the assigned superframe (SF).

13. Transmission system according claim 12, in which the useful data sections (RP) to be stuffed are temporarily stored and/or embedded in four-byte fashion in the stuff locations (105).

14. Transmission system according to claim 13, in which the stuff locations (105) and indicator data (MFI) together occupy at most eight bytes, and/or the indicator data (MFI) occupy at most four bits per superframe (SF).

15. Transmission system according to claim 14, in which the indicator data (MFI) are protected by means of a code, in particular a Hamming code (HC(6,3,3)).

16. Transmission system according claim 15, in which the data transmission is data-transparent and/or time-transparent.

17. Method for the frame-oriented transmission of digital data of a carrier signal using time-division multiplex operation, comprising the steps of having at least one first useful signal (#1) within the carrier signal, providing different data rates between the carrier signal and the first useful signal (#1), embedding first useful data of the first useful signal (#1) in useful data sections (RP) of a first superframe (SF), embedding second useful data of the first useful signal (#1) in stuff locations in the first superframe (SF) in order to achieve rate matching between the carrier signal and the first useful signal (#1), and embedding first indicator data (MFI) in the first superframe (SF), with the aid of which first indicator data (MFI) the second useful data cart be assigned to the first useful signal (#1).

* * * * *